United States Patent [19]
Scherbaum

[11] 3,775,580
[45] Nov. 27, 1973

[54] MINIATURE ELECTRODE CLAMP AND GUIDE FOR ELECTRIC-SPARK MACHINING

[75] Inventor: Karl Scherbaum, Grobzig, Germany

[73] Assignee: VEB Steremat "Hermann Schlimme", Berlin, Germany

[22] Filed: June 6, 1972

[21] Appl. No.: 260,074

[30] Foreign Application Priority Data
Dec. 23, 1971 Germany........... WP B 23p/159 881

[52] U.S. Cl............ 219/69 E, 219/131 F, 219/140
[51] Int. Cl............................................. B23k 9/16
[58] Field of Search................ 219/69 R, 69 E, 140, 219/141, 144, 68, 79, 131 F, 69 V, 125; 279/41, 44, 46; 408/97

[56] References Cited
UNITED STATES PATENTS

| | | | |
|---|---|---|---|
| 3,639,719 | 2/1972 | Cavoli | 219/69 E |
| 2,398,915 | 4/1946 | Bell | 279/44 X |
| 2,845,898 | 8/1958 | Stanek | 279/46 X |
| 2,536,333 | 1/1951 | Waxelbaum | 408/97 |
| 3,633,930 | 1/1972 | MacFarlane et al. | 279/44 |
| 1,492,792 | 5/1924 | Gordon et al. | 279/41 |
| 2,563,309 | 8/1951 | Collins | 279/41 X |
| 2,818,490 | 12/1957 | Dixon et al. | 219/69 E |
| 2,758,238 | 8/1956 | Todd | 219/69 V |

FOREIGN PATENTS OR APPLICATIONS
515,506  12/1939  Great Britain .................. 279/41

Primary Examiner—R. F. Staubly
Assistant Examiner—B. A. Reynolds
Attorney—Albert C. Nolte, Jr. et al.

[57] ABSTRACT

A clamp and guide structure for subminiature electrodes for electric spark machining in which the clamp is comprised of a tubular member having one relatively fixed clamping jaw and one resilient jaw. The jaws have semi-circular positioning grooves for the electrode. A subminiature glass guide is aligned with the jaws for guiding the electrode, the length of the guiding duct in the guide being several times as large as the diameter of the electrode.

8 Claims, 6 Drawing Figures

PATENTED NOV 27 1973 3,775,580

MINIATURE ELECTRODE CLAMP AND GUIDE FOR ELECTRIC-SPARK MACHINING

This invention relates to electric spark machining devices, and is more particularly directed to a clamping and guiding structure for subminiature electrodes for use with such machines for electric spark metal removing operations.

The use of wire-like electrodes of very small cross-section for eroding holes by means of an electric discharge is well known, such machining operations being generally referred to as electric spark machining. In such arrangements, the wire-like electrodes are urged by means of driving rollers through a tubular guide so that they approach the workpiece in accordance with the desired erosion of the workpiece. Stepping mechanisms are actuated by the driving rollers, the stepping mechanisms also being employed in the alignment of the electrodes.

In conventional systems of this type, the electrode guides are generally of a hard metal, insulating plastic material, rubies, or glass. Such guides, however, have the disadvantage that they are formed only as short electrode guiding cylinders for the electrode, the length of the guides being generally only twice as long as the diameter of the electrodes. Since the electrodes in subminiature electric spark machining devices have diameters of only between 0.01 mm and 0.1 mm, the wire-like electrodes in that range of diameters ususally exhibit a certain degree of waviness in their axial direction. As a result of the waviness of the electrodes as they egress from the short guide cylinders, the holes eroded by the electrodes in the electric spark machining process are not round, and are not true to the required dimensions. Such systems also have the disadvantage that the distance between the vibrating push rollers, the guide element and the workpiece is not small enough for the proper approach of the electrode to the work piece. Consequently, the electrode may bend in a sideward direction, so that the boring process is interferred with or entirely prevented.

In another type of electrode holding arrangement, the electrodes are fixedly held by means of chucks or jaws of fixed and springing clamping elements. From the dimensional standpoint, however, such conventional clamping tools are not well suited to the holding of the electrodes having diameters of only 0.01 mm in such restricted range of subminiature diameters. The conventional clamping arrangements have a tendency to produce flattened spots on the fine wire, as well as to bend and split the wire since the clamping means must simultaneously impart a vibrational movement to the electrode wire. Electric spark machining has the characteristic that the apertures and holes which are to be machined are the true replica of the shape of the electrode employed. As a consequence, in the above described arrangement, due to deviation of the electrode, the holes or apparatus will not be round, and will be deformed, so that distinctly conical holes will be produced. This results in a high reject ratio, with the consequent necessary cost of refabricating the workpieces.

It is therefore an object of the present invention to provide a device of simple design which enables subminiature electrodes for electric spark machining operations to be aligned in the desired manner, and to be properly guided without having the disadvantages of the above described arrangements.

Briefly stated, in accordance with the invention, the shaft of a subminiature clamping dog with its two clamping jaws consist of a single piece, the clamping jaws having semicircular positioning grooves. One of the jaws is rigid, and the other jaw is capable of being moved with a springing resilience, due to the use of a narrower wall in the clamping structure. A subminiature glass guide element is provided, which has a length which is several times greater than the diameter of the electrode. The diameter of the guiding duct is also selected so that it will allow unrestricted movement of the electrode. The subminiature glass guide element is provided with a conical tube recess having a funnel angle of about 90° at its capillary opening and terminating in an outer cone having an angle of about 90°, so that the end of the guide element in the plane thereof is as small as possible.

In the arrangement of the invention, it is possible to properly clamp electrodes having diameters of between 0.01 mm and 0.03 mm, and to hold the electrodes in a slipfree manner at a desired true angle, without damage. As a consequence, the electric spark machine employing this arrangement can erode apertures and holes in a workpiece having high quanity, with uniform shape and standard output.

The invention will now be disclosed in greater detail with reference to the accompanying drawings, in which.

Figure 1:
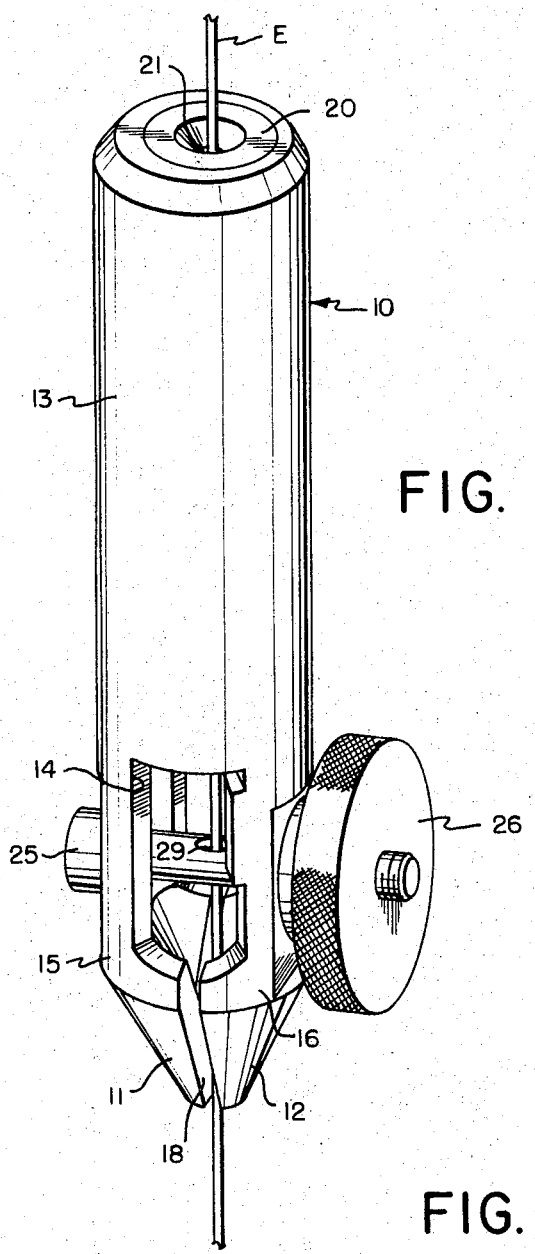
FIG. 1 is a perspective view of a subminiature clamping dog according to one embodiment of the invention.
Figure 4:
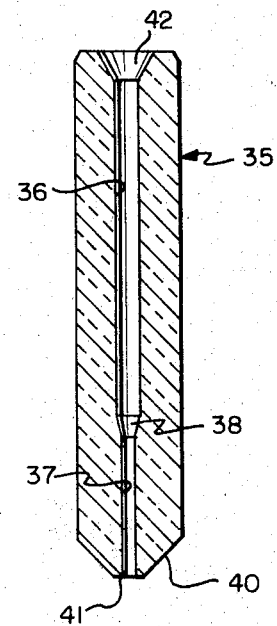
FIG. 4 is a cross-sectional view of a subminiature glass guide element according to the invention.
Figure 2:
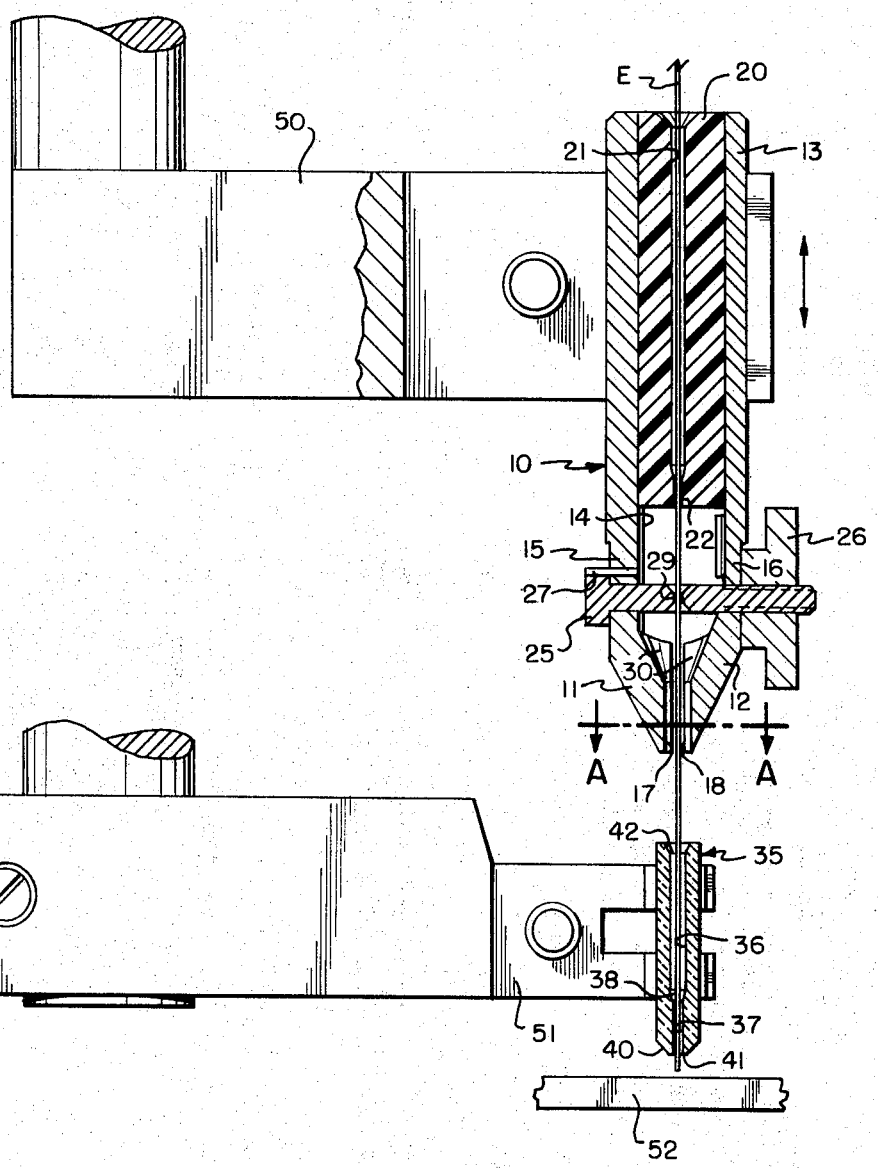
FIG. 2 is a cross-sectional view of the clamping dog of FIG. 1 illustrating the manner of support thereof, as well as a cross-sectional view of a subminature glass guide element for use therewith, and the support for the glass guide element.
Figure 6:
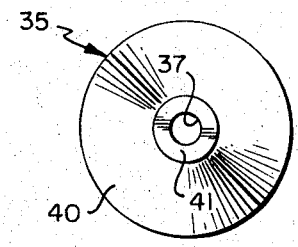
FIG. 6 is a bottom view of the glass guide element of FIG. 4.

Referring now to the drawings, and more in particular to FIGS. 1 and 2, therein is illustrated in clamping dog 10 according to one embodiment of the invention. The clamping dog 10 has a fixed or rigid clamping jaw 11, and a movable jaw 12. The jaws 11 and 12 are formed integrally as end portions of a generally tubular member 13, with a generally rectangular opening 14 being provided in the member 13 on opposite sides thereof so that the fixed jaw 11 is joined to the end of the tubular member 13 by way of a wall 15, and the movable jaw 12 is joined to the opposite side of the tubular member 13 by way of a wall 16. The walls of the tubular member 13 are eccentric, so that the wall 15 is much thicker than the wall 16. As a consequence, the jaw 11 is rigidly affixed with respect to the tubular member 13, while the jaw 12 is resiliently held on the end of the tubular member 13.

Figure 3:
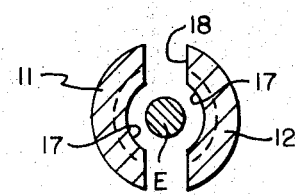
FIG. 3 is a cross-sectional view of the subminiature clamping dog of FIG. 2 taken along the line A—A.
Figure 5:
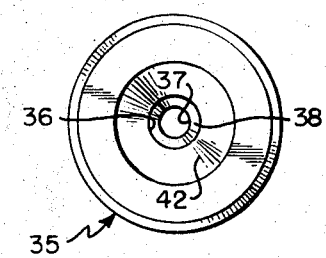
FIG. 5 is a top view of the guide element of FIG. 4.

The jaws 11 and 12 serve to clamp the electrode E which extends axially through the clamping dog. For this purpose, the jaws 11 and 12 are separated by a slot 18 which has a constant width less than the diameter of the electrode E. Since the slot is narrower than the diameter of the electrode, the electrode E cannot enter the slot when a new electrode E is introduced into the clamping dog. The inner surface of the jaws 11 and 12 adjacent the slot 18 have positioning grooves 17 which serve as guide grooves and means for clamping the jaws to the electrode. The grooves 17 are illustrated more clearly in FIG. 3. The radius of the grooves is adapted to the electrode wire diameter. For proper functioning of the clamping dog, it is important that the slot 18 and the positioning grooves 17 are in perfect alignment with the outer diameter of the shaft 13.

The upper end of the shaft 13 is provided with a plastic grommet 20. The upper end of the plastic grommet 20 has a bore 21 extending axially for the rough guidance of the electrode wire, whereas the lower portion of the plastic grommet has a centering bore 22 of smaller diameter and aligned with the bore 21 for centering the electrode wire. A cylindrical screw 25 is provided extending transversely through the walls 15 and 16, the screw having a threaded end extending from the wall of the shaft so that a knurled knob-like nut 26 may be screwed thereon for controlling the position of the clamping jaw 12. The other end of the screw 25 is enlarged, and a set pin 27 is provided therein and extending into the wall of the shaft for inhibiting rotation of the screw. Since the screw 25 extends through the center of the clamping dog, a duct aperture 29 is provided extending therethrough for the electrode wire. The jaws 11 and 12 of the clamping dog may thereby be closed by manually turning the nut 26, the resiliently held jaw 12 thereby being urged toward the fixed jaw 11. When the jaws are opened by reverse rotation of the knob 26, the resilience of the wall 16 urges the jaw 12 outwardly.

The upper inside surfaces of the jaws 11 and 12 are funnel shaped, as indicated at 30, in order to guide the electrode into the jaws properly when the wire is inserted in the dog.

The subminiature glass guide 35 is illustrated in FIGS. 2 and 4–6. This element may be comprised of a glass capillary tube of subminiature dimensions. The guide 35 has a capillary axially extending hole 36 extending from its upper end and terminating at its lower end in the electrode guide duct 37. The hole 36 is of a diameter which can easily receive the electrode E for freedom of axial movement therein. A slightly conical transition portion 38 is provided between the portions 36 and 37 of the hole. The guide duct portion 37 has a length which may be a multiple of the electrode E diameter. In other words, the portion 37 may have a length a number of times greater than the diameter of the electrode. The lower end 40 of the element 35 is formed as a cone with a cone angle of about 90° to enable ease of adjustment, as well as to make the end plane 41 of the guide element as small as possible. This construction enables ready observation of the electrode E, and the small space it occupies permits free escape of the erosion gas from the broader hole. The upper end of the hole 36 may be in the form of a funnel shaped cone 42, having a cone angle of, for example, 90°, to facilitate introduction of the electrode E into the capillary tube 35.

Referring now to FIG. 2, the clamping dog 13 is supported in a suitable support 50 for reciprocating axial movement, and the subminiature guide 35 is supported in a suitable support 51 so that the hole in the guide 35 is aligned with the end of the shaft 13 between the jaws 11 and 12 and a workpiece 52. The electrode E is introduced from above to the duct 21 and 22, and thence to the aperture 29, The funnel shaped portion 30 within the jaw 11 and 12 permit the electrode E to be properly introduced into the positioning grooves 17. The electrode wire E extends from the jaw downwardly through the wall in the glass guide 35, and extends downwardly through the end 41 thereof. Final clamping of the electrode in its fixed position is then made by means of the knurled knob 26.

The vibratory movement and the radial screening against interference effects are transmitted to the electrode E by way of the support 50 and the clamping jaws 11 and 12 of the subminiature clamping dog.

While the invention has been disclosed with reference to only a single embodiment thereof, it will be obvious that many modifications and variations may be made therein, and it is intended in the following claims to cover all such variations and modifications that fall within the true spirit and scope of the invention.

What is claimed is:

1. A device for clamping and guiding subminiature electrodes for an electric spark machining apparatus for metal workpieces, said device comprising a subminiature clamping dog comprised of an eccentric hollow shaft having on one end thereof a pair of clamping jaws, said clamping jaws and shaft forming a unitary element, one of said jaws being formed as an extension of the thicker wall of said shaft and being rigid with respect to the remainder of said shaft, the other of said jaws being connected to the remainder of said shaft by the thinner wall thereof to permit resilient swinging of said other jaw, said jaw having axially extending semicircular positioning grooves therebetween for receiving an electrode.

2. The device of claim 1 further comprising a subminiature glass guide element having a guiding duct that is of a length which is a multiple of the diameter of said electrode, said guide element being positioned axially with respect to said shaft whereby an electrode extending from said jaws extends through said guide element to a workpiece.

3. The device of claim 2 wherein the guiding duct has an introducing funnel with a cone angle of 90° at the end thereof toward said jaws, the other end of said guide element being externally tapered inwardly toward said end at a cone angle of 90° and terminating in an end plane at said other end of said guide element.

4. The device of claim 2 wherein said guiding duct of said subminiature glass guiding element has a diameter permitting free movement of said electrode.

5. The device of claim 1 wherein said jaws are separated by a slot having a constant width smaller than the diameter of said electrode.

6. The device of claim 5 wherein said shaft has a pair of opposite rectangular openings in the walls thereof at the end of said slot at which said jaws are connected to the remainder of said shaft.

7. The device of claim 5 further comprising clamping means mounted on said shaft for urging said jaws together.

8. The device of claim 7 wherein said clamping means comprises a clamping screw extending transversely through said shaft in the wall portion thereof between said rectangular openings, said clamping screw having an aperture extending therethrough axially with respect to said shaft and aligned with said positioning grooves.

* * * * *